United States Patent [19]

Moon

[11] Patent Number: 5,790,189
[45] Date of Patent: Aug. 4, 1998

[54] BUS-CONTROLLED TELEVISION CAPABLE OF BEING CONTROLLED WITHOUT A BUS CONTROLLER AND A CONTROL METHOD THEREOF

[75] Inventor: Kyung-ho Moon, Kyungki-do, Rep. of Korea

[73] Assignee: Samsung Electronics Co., Ltd., Kyungki-do, Rep. of Korea

[21] Appl. No.: 575,391

[22] Filed: Dec. 20, 1995

[30] Foreign Application Priority Data

Jan. 20, 1995 [KR] Rep. of Korea .................. 1995 952

[51] Int. Cl.$^6$ ........................................... H04N 17/04
[52] U.S. Cl. ............................. 348/189; 348/190
[58] Field of Search ........................ 348/180, 189, 348/190, 184, 52, 53, 177, 191

[56] References Cited

U.S. PATENT DOCUMENTS

| | | | |
|---|---|---|---|
| 4,858,006 | 8/1989 | Suzuki et al. | 348/189 |
| 5,099,326 | 3/1992 | Hakamada et al. | 348/190 |
| 5,325,196 | 6/1994 | Yoshimi et al. | 348/190 |

Primary Examiner—Victor R. Kostak
Attorney, Agent, or Firm—Sughrue, Mion, Zinn, Macpeak & Seas, PLLC

[57] ABSTRACT

A bus-controlled television having function control units interconnected via a data line is provided and includes a remote controller, a microcomputer, and a memory. The remote controller generates mode control signals which respectively correspond to operational modes of the television and which are used to test various functions of the television. The controller selectively outputs one of the mode control signals as a selected mode control signal based on commands input to the controller by a user. The microcomputer inputs the selected mode control signal and designates one of the modes as a selected operational mode. Furthermore, the microcomputer outputs mode data corresponding to the selected operational mode via the data line to instruct one of the function control units to operate according to the selected mode. The memory stores values of the mode data for the selected operational mode. The modes of the television may include: a service mode for performing various control functions after the television has been manufactured, a factory mode for performing the various control functions while the television is being manufactured, an aging mode for preheating a cathode ray tube of the television, and a high speed mode for performing analog functions of the television at high speed. In addition, various methods are provided for performing the operation modes of the television.

52 Claims, 9 Drawing Sheets

FIG. 5A
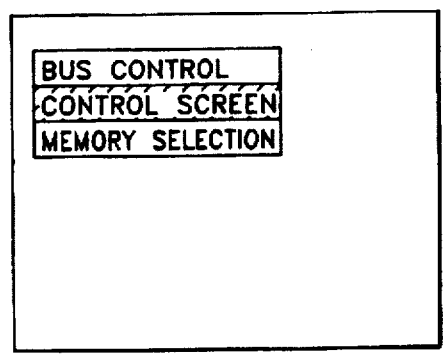
FIG. 5B
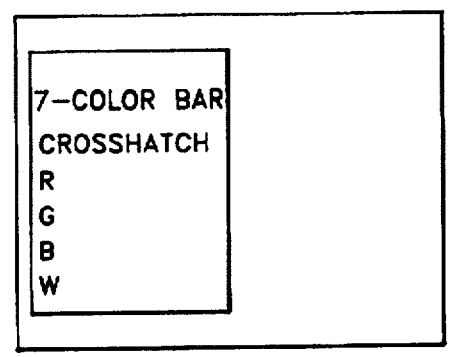
FIG. 5C
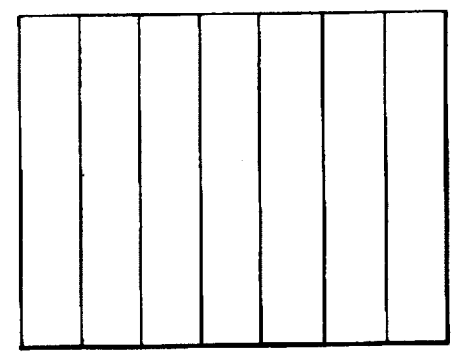
FIG. 5D
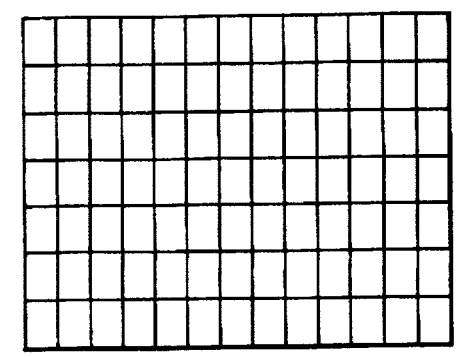

FIG. 6A
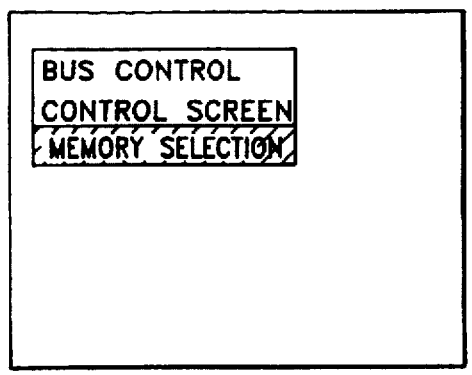
FIG. 6B
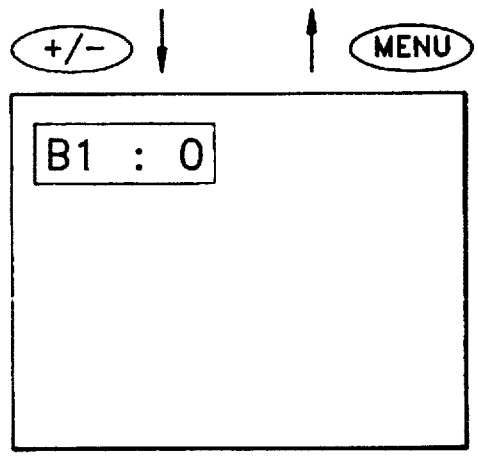
FIG. 6C
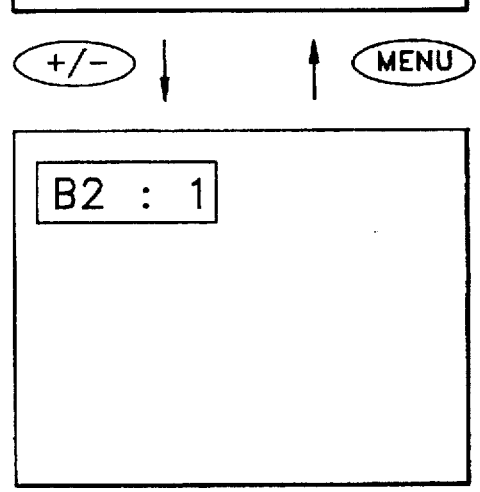
FIG. 6D
| BIT | B7 | B6 | ··· | B1 |
|---|---|---|---|---|
| 0 | TV ONLY | TV, TV/V | ··· | SOUND AUTO OFF CANCEL |
| 1 | TV/V | VIDEO ONLY | ··· | SOUND AUTO OFF |

5,790,189

BUS-CONTROLLED TELEVISION CAPABLE OF BEING CONTROLLED WITHOUT A BUS CONTROLLER AND A CONTROL METHOD THEREOF

FIELD OF THE INVENTION

The present invention relates to a bus-controlled television and a method for controlling the television. More particularly, the invention relates to a bus-controlled television which can be manufactured without the use of a bus controller. Furthermore, the television is capable of verifying that it is operating correctly in response to various inquiry commands transmitted via a remote controller. Also, the invention relates to a method of manufacturing the television and a method of verifying the operation of the television.

BACKGROUND OF THE INVENTION

A conventional television comprises a microcomputer (or system controller) and several function control units which control various functions of the television. Examples of function control units may include a multi voice processor, a voice signal processor, a video signal processor, a teletext circuit, and a picture-in-picture circuit.

In order to instruct the television to perform a particular function, the microcomputer outputs a control signal to a selected function control unit via a corresponding control port, and the selected function control unit performs the corresponding function in accordance with the control signal. However, since the microcomputer cannot perform other functions while controlling the selected function control unit, the processing time of the microcomputer increases. Also, as the number of function control units increases, the amount of commands and instructions output from the microcomputer increases, and thus, the processing time of the microcomputer further rises. In addition, if the number of function control units is high, the wiring connections among the units and the microcomputer become more complex, and the amount of area on the printed circuit board and number of components required to implement the control units likewise increase. Furthermore, as the design of the above system becomes more difficult, the reliability of the system decreases.

In order to reduce the complexity and increase the reliability of the conventional television, the function control units and microcomputer may be connected via various buses. In particular, the microcomputer and the control units may be connected via bi-directional serial data and serial clock lines. Also, each function control unit may be assigned a specific address so that the microcomputer can instruct a particular function control unit to perform a particular function by outputting address and control data that correspond to the particular control unit. The above described system is referred to as an I²C bus system and the above described television is referred to as a bus-controlled television.

In the conventional method of producing and testing the bus-controlled television mentioned above, a factory must be equipped with an bus controller 3. Specifically, as shown in FIG. 1, the bus controller 3 and the bus-controlled television 1 are connected together via a bus connector. In order to ensure that the function control units of the television are operating properly, an operator varies the preset values for the television 1 by outputting a television test signal from the controller 3 to the television 1 via a television test signal cable. Subsequently, a camera 2 detects the characters and other information displayed on the screen of the television 1 in response to the television test signal and outputs a resultant signal to the bus controller 3. Subsequently, if the displayed information is improper, the operator must adjust the preset values until the characters displayed by the television 1 are correct.

As illustrated above, the bus controller 3 is essential for manufacturing and testing the television 1 via the conventional method. Thus, since the bus controller 3 is expensive, the cost of producing and examining the television 1 is relatively high.

In addition, when the conventional television 1 needs to be repaired, a repairman typically must readjust various display parameters after repairing the television 1 to ensure that it is working properly. For example, if the cathode ray tube (CRT), tuner, or memory within the television needs to be replaced, various preset values of the display parameters controlling the function control units within the television may need to be calibrated. However, the preset values are generally manually controlled while the television is partially disassembled, and consequently, the adjustment of such values is time consuming.

SUMMARY OF THE INVENTION

Accordingly, it is a first object of the present invention to provide a method for manufacturing a bus-controlled television without using a bus controller.

It is a second object of the present invention to provide a method for uniformly preheating the CRT when the CRT and the chassis of the television are combined while the television is being manufactured. In particular, the CRT is preheated by storing predetermined patterns of video images in a memory within the television and projecting the predetermined patterns onto the CRT. Accordingly, external television signals do not need to be supplied via an antenna.

It is a third object of the present invention to provide a method for enabling manufacturers to perform analog functions of the television at high speeds to reduce the time needed to test such analog functions.

It is a fourth object of the present invention to provide a method for easily determining whether a television has been correctly repaired by transmitting various control signals to the television via a remote controller.

It is a fifth object of the present invention to provide a bus-controlled television suitable for performing the above objects.

To accomplish the above objects of the present invention, a bus-controlled television having function control units interconnected via a data line is provided. The television comprises: a remote controller which generates mode control signals that respectively correspond to operational modes of the television, wherein the operational modes are used to test various functions of the television and wherein the remote controller outputs one of the mode control signals as a selected mode control signal; a microcomputer which designates one of the operational modes as a selected operational mode in accordance with the selected mode control signal and which outputs mode data corresponding to the selected operational mode via the data line in order to instruct at least one of the function control units to operate according to the selected mode; and a memory for storing preset values of the mode data for the selected operational mode.

BRIEF DESCRIPTION OF THE DRAWINGS

The above objects and other advantages of the present invention will become more apparent by describing in detail

Figure 1:
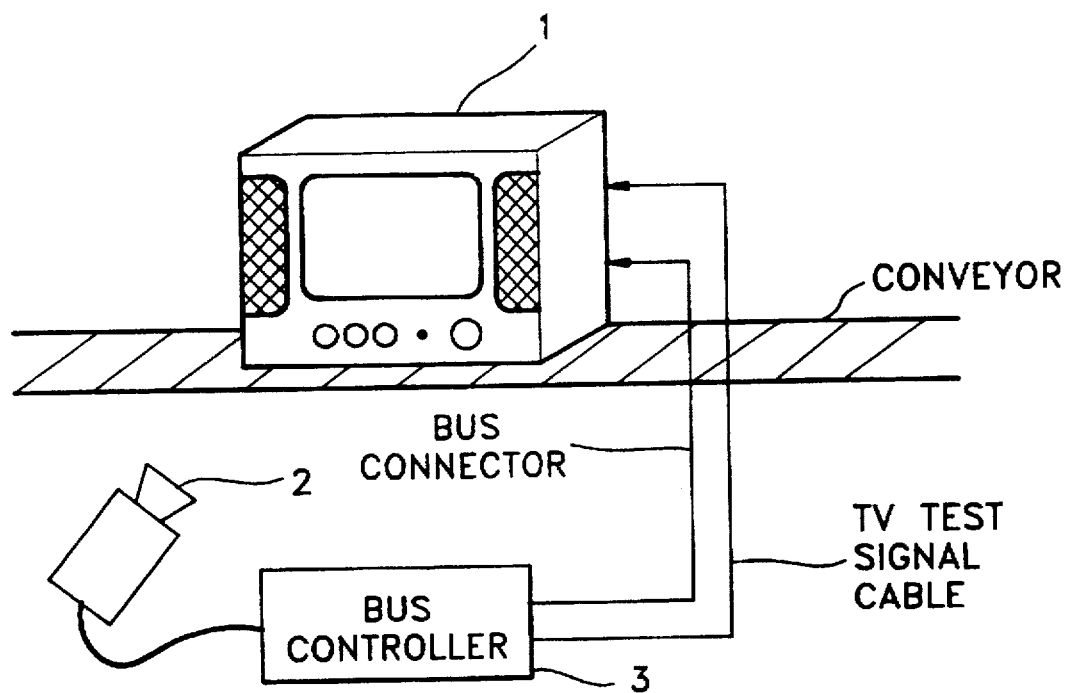
Figure 2:
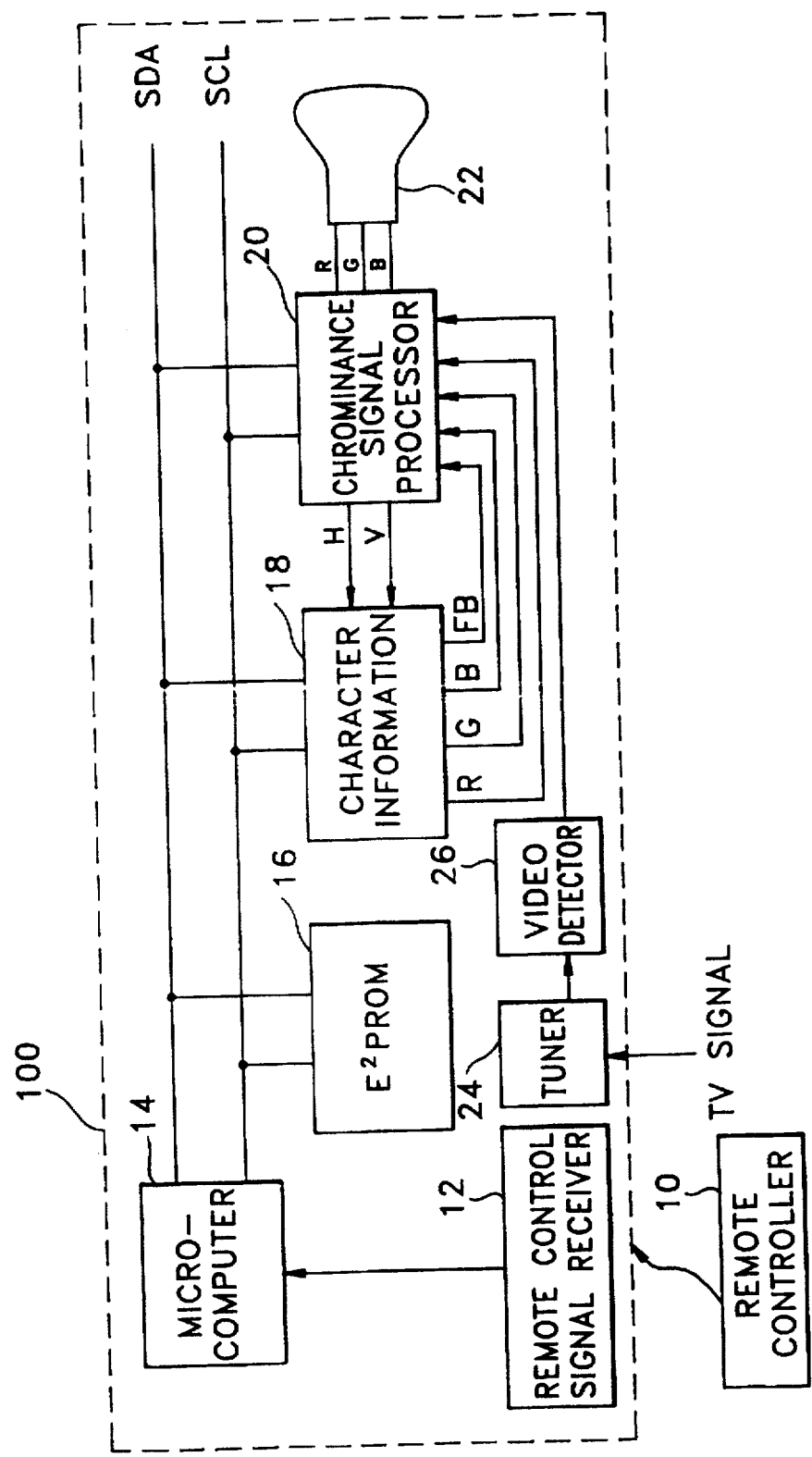
Figure 3:
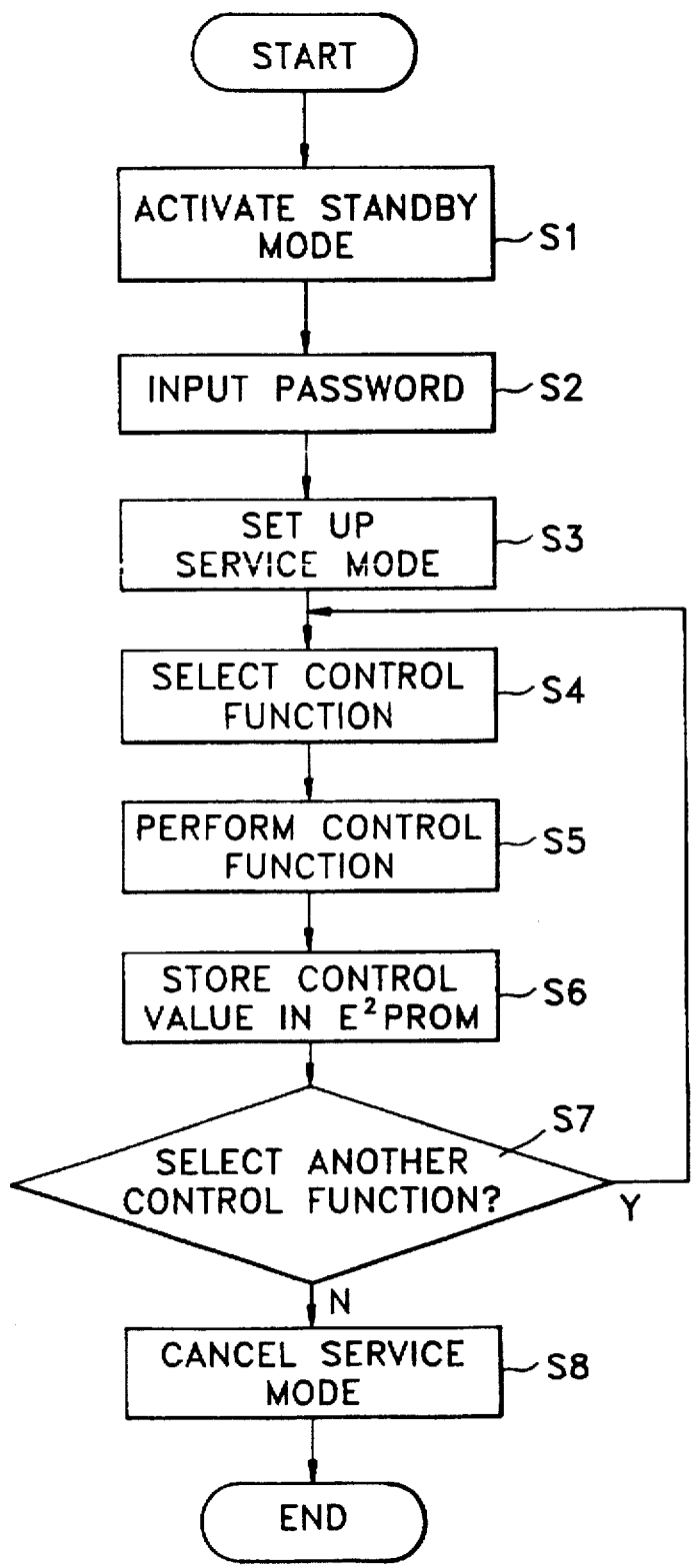
Figure 4A:
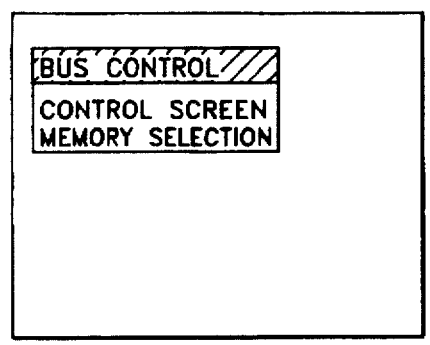
Figure 4B:
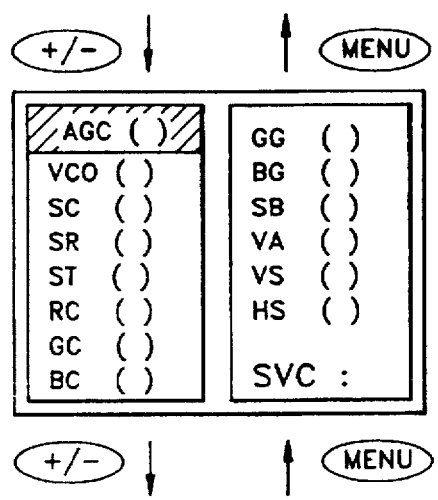
Figure 4C:
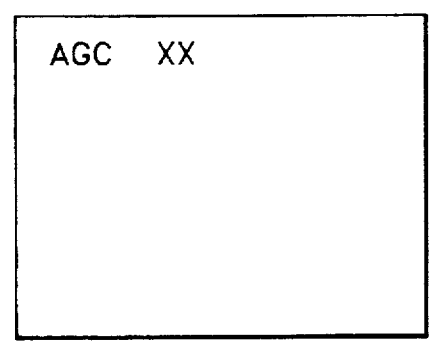
Figure 4D:
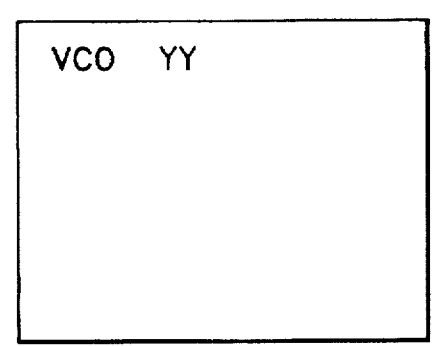
Figure 7:
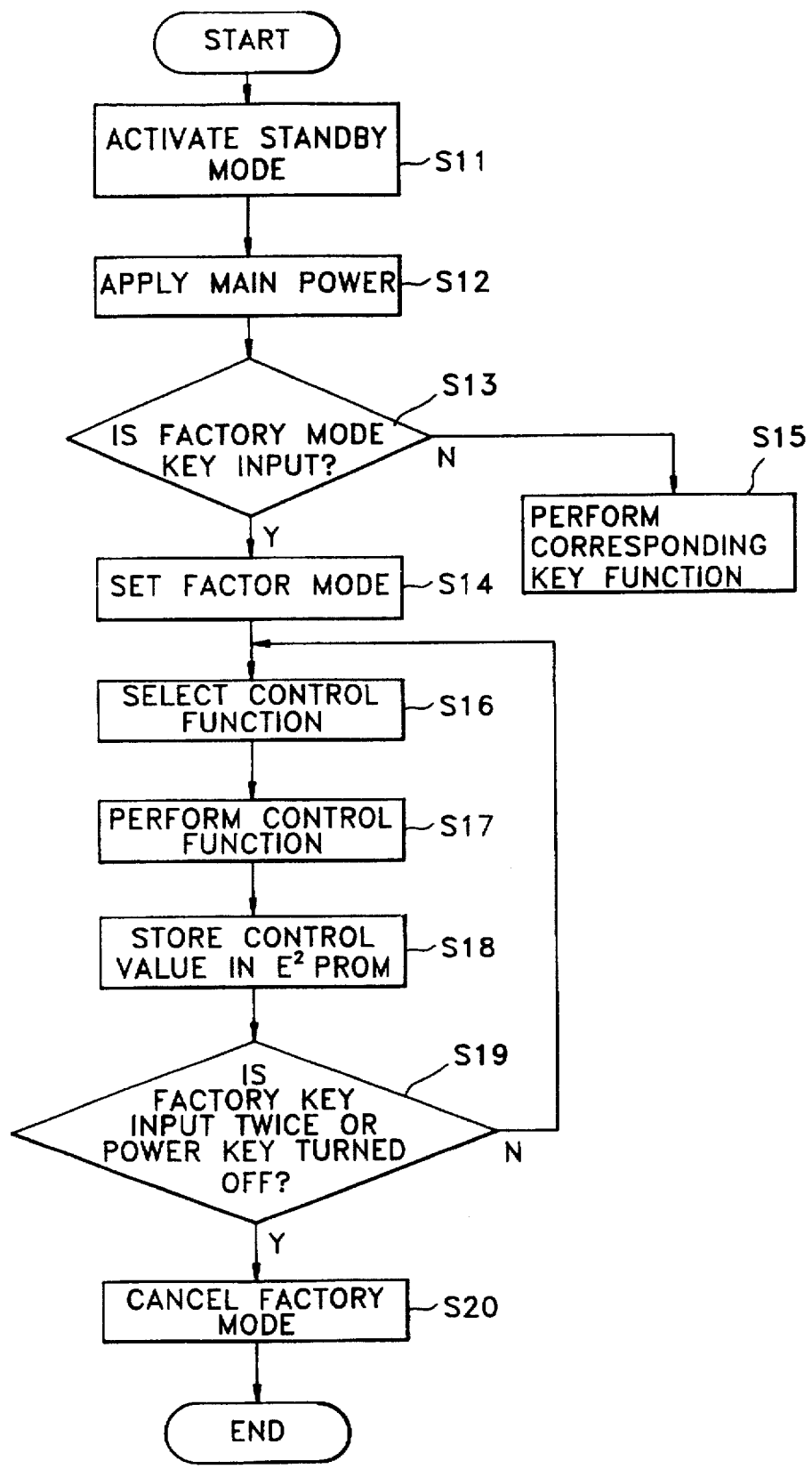
Figure 8:
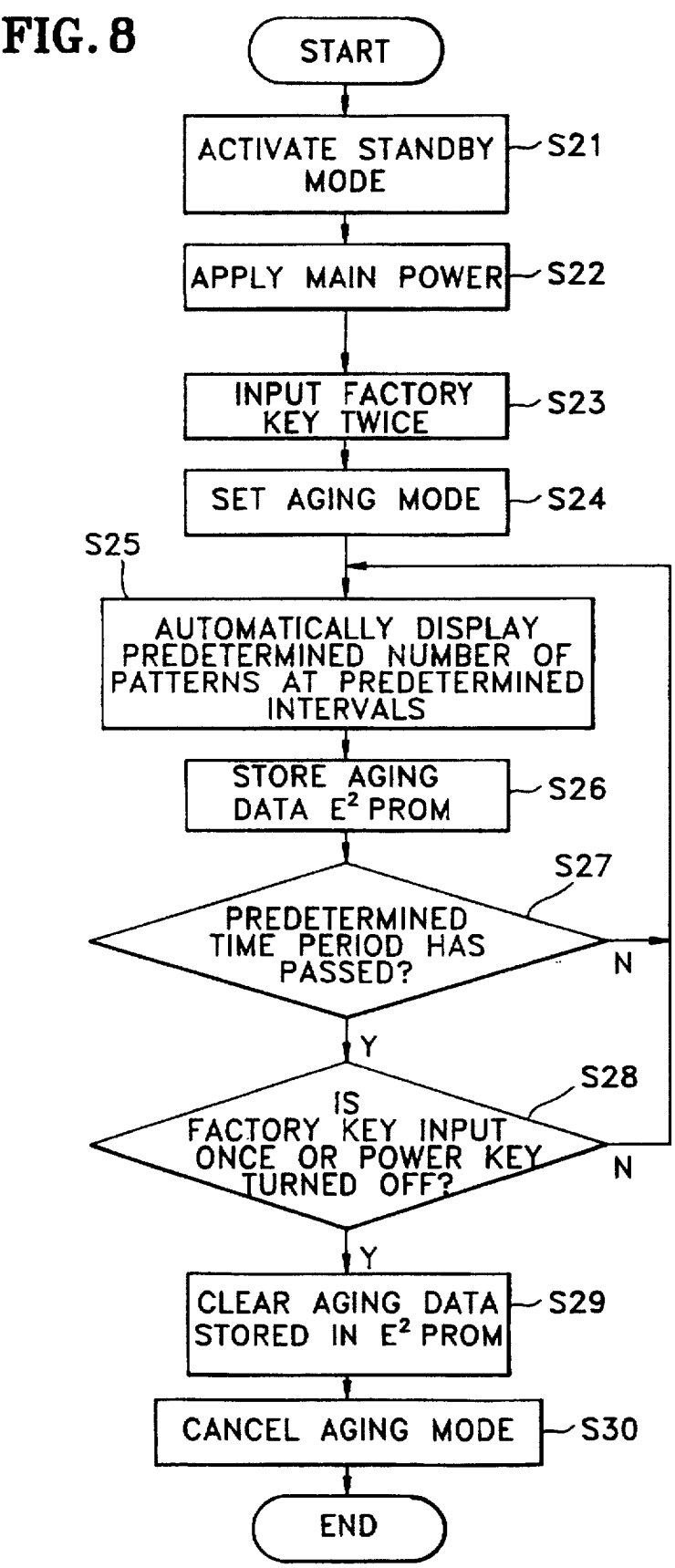
Figure 9:
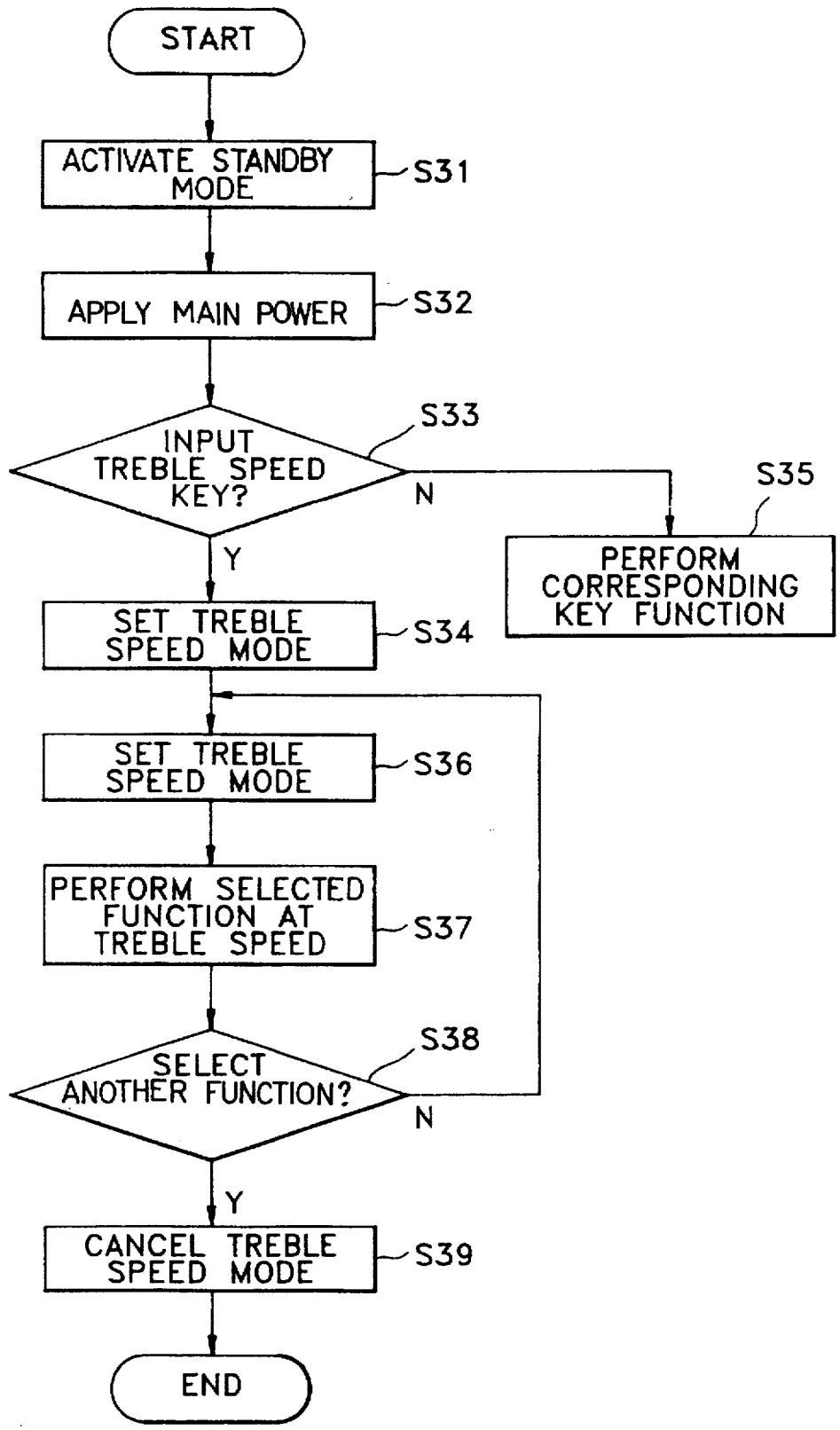

3 preferred embodiments thereof with reference to the attached drawings in which:

FIG. 1 is a block diagram of a conventional bus-controlled television and a bus controller;

FIG. 2 is a block diagram of a bus-controlled television according to the present invention;

FIG. 3 is a flow chart of a service mode performed by the microcomputer shown in FIG. 2;

FIG. 4A illustrates a main menu displayed on the screen during the bus control function;

FIG. 4B illustrates a sub menu comprising a list of detailed functions used during the bus control function;

FIG. 4C illustrates how one of the detailed functions used during the bus control function is displayed;

FIG. 4D illustrates how another one of the detailed functions used during the bus control function is displayed;

FIG. 5A illustrates a main menu displayed on the screen during the screen control function;

FIG. 5B illustrates a sub menu comprising a list of detailed functions used during the screen control function;

FIG. 5C illustrates how one of the detailed functions used during the screen control function is displayed;

FIG. 5D illustrates how another one of the detailed functions used during the screen control function is displayed;

FIG. 6A illustrates a main menu displayed on the screen during the memory selection control function;

FIG. 6B illustrates how a particular bit is displayed during the memory selection control function;

FIG. 6C illustrates how another particular bit is displayed during the memory selection control function;

FIG. 6D illustrates a memory selection table used during the memory selection control function;

FIG. 7 is a flow chart of a factory mode performed by the microcomputer shown in FIG. 2;

FIG. 8 is a flow chart of an aging mode performed by the microcomputer shown in FIG. 2; and FIG. 9 is a flow chart of a high speed mode performed by the microcomputer shown in FIG. 2.

DETAILED DESCRIPTION OF THE INVENTION

FIG. 2 is a schematic diagram of a bus-controlled television 100 according to an embodiment of the present invention. As shown in the figure, the television 100 comprises a remote control signal receiver 12, a microcomputer 14, an electrically erasable programmable read only memory (E²PROM) 16, a character information generator 18, a chrominance signal processor 20, a cathode ray tube (CRT) 22, a tuner 24, and a video detector 26.

Also, a remote controller 10 is provided for transmitting various remote control signals to the remote control signal receiver 12 in order to control particular functions of the television 100. For example, the controller 10 may have a keypad comprising various mode keys and may transmit mode control signals to the television when one or more of the mode keys are depressed. Furthermore, the mode control signals may cause the microcomputer 14 to perform one of a plurality of modes for controlling the television 100. Some of the modes performed by the microcomputer 14 may include a service mode, a high speed mode, an aging mode, and a factory mode. Moreover, the mode keys may only be provided on the remote controller 12 used by a manufacturer

4 or repairman of the television and not on a remote controller used by the individual consumers.

An illustrative example of the operation of the television 100 will be described below. First, one or more of the mode keys on the remote controller 10 is depressed, and the controller 10 transmits a corresponding mode control signal to the remote control signal receiver 12. Subsequently, the receiver 12 outputs the received signal to microcomputer 14.

The microcomputer 14 inputs the mode control signal and determines to which mode the signal corresponds. After such determination is made, the microcomputer 14 outputs control data via a serial data (SDA) line and a clock signal via a serial clock (SCL) line. Furthermore, the preset values of the various control data are stored in the E²PROM 16.

The character information generator 18 comprises a on screen display (OSD) circuit and a pattern generator for generating character data and predetermined screen patterns. As a result, the generator 18 is capable of generating character information (e.g. a menu) comprising control functions which can be performed in the selected mode by inputting the control data output from the microcomputer 14. In particular, generator 18 inputs data relating to the font, color, position, and size of the character data to be generated via the SDA line and inputs horizontal and vertical synchronization signals H and V from the chrominance signal processor 20. Subsequently, the generator 18 utilizes the OSD circuit and the pattern generator to generate character data comprising red (R), green (G), blue (B), and fast blanking (FB) signals relating to the appropriate menu.

The tuner 24 comprises an input terminal for receiving an external television test signal which may be used to assist in adjusting various display parameters of the television 100. After tuning the television test signal, the signal is output to the video detector 26 which extracts a video signal from the tuned television signal and transmits the video signal to chrominance signal processor 20.

The chrominance signal processor 20 inputs the character data from the generator 18, the video signal from the video detector 26, and the control data for various control functions which correspond to the selected mode from the microcomputer 14. Subsequently, the processor 20 displays character data onto a predetermined position of CRT 22 based on the R, G, B, and FB signals or displays the video signal output from video detector 26.

In the present embodiment, the function control units include the E²PROM 16, the character information generator 18, and the chrominance signal processor 20. However, the SDA and SCL lines may also connect additional or alternative function control units to the microcomputer 14.

Some of the modes performed by microcomputer 14 will be explained below. Specifically, the service mode, the factory mode, the aging mode, and the high speed mode will be respectively described with respect to FIGS. 3, 7, 8, and 9.

An example of operation of the service mode is illustrated in the flow chart shown in FIG. 3. In particular, the service mode is an operational mode in which a repairman can quickly and easily determine if the television is functioning properly after a malfunctioning CRT, tuner, or memory has been replaced or repaired.

As shown in FIG. 3, the television 100 is initially in a standby state before being set in the service mode (step S1) The standby state may represent the situation in which a power plug of the television 100 is inserted in an electrical outlet and power of the television is turned off. When the television 100 is in the standby state, a repairman may set the television into the service mode by entering an appropriate command or password (step S2). For example, the repairman may input a password by pressing a mute key and a power key on the remote controller 10 and inputting a certain access code number or password. Furthermore, the password may only be known to the repairman and not to general consumers of the television 100.

After the password is entered, the television is set in is the service mode (step S3). As a result, the microcomputer 14 outputs control data relating to the service mode, and the character information generator 18 and chrominance signal processor 20 generate and display a main menu which comprises various control functions that correspond to the service mode. For instance, as illustrated in FIG. 4A, the control functions listed in the main menu may include a bus control function, a screen control function, and a memory selection control function.

Once the main menu is displayed, the repairman can selectively highlight one of the various control functions on the menu by pressing the channel up/down key on the remote controller 10. Furthermore, a sub menu corresponding to the highlighted control function can be displayed by pressing the volume up/down key on the remote controller 10. Examples of selecting and performing the various control functions of the service mode are described below.

In order to select the bus control function, the channel up/down key is pressed until the bus control function is highlighted on the main menu (FIG. 4A). After the function is highlighted, if the repairman presses the volume up/down key, a sub menu of a list of detailed functions corresponding to the bus control function will be displayed on the CRT 22. As shown in FIG. 4B, examples of the detailed functions listed in the sub menu may include an automatic gain control (AGC), a voltage-controlled oscillator (VCO), a sub-contrast (SC), a sub-color (SR), a sub-tint (ST), a red cut-off (RC), a green cut-off (GC), a blue cut-off (BC), a green gain (GG), a blue gain (BG), a sub-brightness (SB), a vertical amplitude (VA), a vertical shift (VS), a horizontal shift (HS), and a sound mute (SVC) function. Furthermore, the preset values of the data utilized in each of the detailed functions are shown in the sub menu in parenthesis.

The various detailed functions illustrated in the sub menu can be selectively highlighted by the pressing the channel up/down key, and the highlighted detailed function can be chosen by pressing the volume up/down key. As shown in FIG. 4C, when the AGC function is highlighted and selected, the AGC function is displayed along with its initial preset value "XX". However, a repairman can change the preset value of the AGC function by pressing the volume up/down key on the remote controller 10. Furthermore, the repairman can sequentially page through the detailed functions by pressing the channel up/down key. For example, as illustrated in FIG. 4D, when the AGC function is displayed, the next detailed function (i.e. The VCO function) can be displayed by pressing the channel down key. Afterwards, the AGC function could be displayed again by pressing the channel up key.

In addition, the sub menu of the list of detailed functions can be displayed while a particular detailed function is being displayed by pressing the menu key on the remote controller 10 (FIGS. 4B and 4C). Similarly, the main menu can be displayed while the sub menu is being displayed by pressing the menu key (FIGS. 4A and 4B).

Other keys on the remote controller 10 may be utilized to input various commands during the bus control function. For example, a mute key may be depressed to turn a single horizontal line on or off or for muting a video signal. Also, a standard screen key may be used to change the values of the brightness B and contrast C of the video signal displayed on the CRT 22. For example, repeatedly pressing the standard screen key could cause the values of the brightness B and contrast C of the signal to repeatedly and sequentially change according to the following values: B=50, C=100→B=30, C=30→B=20, C=20→B=10, C=10→B=0, C=0→B=50, C=100 . . . .

The preset values of the detailed functions shown in FIG. 4B are stored in $E^2PROM$ 16. In addition, when control data is output from the microcomputer 14 to one of the function control units, the preset values of certain detailed functions have a higher priority than other detailed functions. For instance, when control data is output to the chrominance signal processor 20, the preset values of the RC, GC, BC, GG and BG functions have the highest priority and are output first. Furthermore, the control data should be output in synchronicity with and completed within the vertical blanking period.

Another control function which may be performed in the service mode is the screen control function. Typically, the repairman performs the screen control function in order to evaluate how clearly a video image is displayed on the CRT 22 and how accurately the red, green, and blue beams projecting the video image converge on the CRT 22.

An illustrative example of the screen control function is shown in FIGS. 5A to 5D. As illustrated in FIG. 5A, the repairman presses the channel up/down button to selectively highlight the screen control function on the main menu, and the highlighted function is selected by pressing the volume up/down key on the remote controller 10.

After the screen control function is selected, a sub menu of a list of the detailed functions corresponding to the screen control mode is displayed. For example, as illustrated in FIG. 5B, the list detailed functions may include various pattern screen functions such as a seven color bar screen function, a cross hatch screen function, a red (R) screen function, a green (G) screen function, a blue (B) screen function, and a white (W) screen function.

While the sub menu is displayed, the repairman can highlight one of the detailed functions by pressing the channel up/down key, and the highlighted detailed function can be selected by pressing the volume up/down key. For example, if the seven color bar screen function is selected, seven vertical bars of different colors will be displayed on the screen as shown in FIG. 5C. Furthermore, the repairman can sequentially page through the detailed functions by pressing the channel up and channel down keys. For example, as illustrated in FIG. 5D, when the seven color bar screen function is displayed, the next detailed function (i.e. The cross hatch screen function) can be displayed by pressing the channel down key. Afterwards, the seven color bar screen function could be displayed again by pressing the channel up key.

If one of the pattern screen functions (e.g. The seven color bar screen function) is selected during the screen control mode and is displayed improperly, the display of the pattern screen function can be corrected by utilizing the bus control function. Specifically, the repairman could return to the main menu, select the bus control function from the main menu (FIG. 4A), and display the corresponding list of detailed functions (FIG. 4B). Then, the particular detailed function (e.g. The AGC function) which is causing the improper display of the seven color bar screen function could be selected. Then, once the AGC function is displayed, the repairman could change the preset value of the AGC function to a value which causes the seven color bar screen function to be correctly displayed (FIG. 4C). Afterwards, the repairman could again utilize the screen control function to display the seven color bar screen function to confirm that the preset value of the AGC function was properly adjusted.

Another control function which can be performed in the service mode is the memory selection control function. The memory selection control function is used after an old or malfunctioning memory has been replaced with a new memory to ensure that the data stored in the new memory is correct. For instance, the new memory may be initialized during the memory selection control function by assigning certain values to particular bits (e.g. bits B1 to B7) of the new memory so that the television 100 performs certain options.

An illustrative example of the memory selection control function is shown in FIGS. 6A to 6D. As illustrated in FIG. 6A, the repairman presses the channel up/down button to selectively highlight the memory selection control function on the main menu, and the highlighted function is selected by pressing the volume up/down key on the remote controller 10.

After the memory selection control function is selected, a first particular bit B1 of the memory is displayed as shown in FIG. 6B. While the bit B1 is displayed, the repairman can change the value of the bit B1 so that the television 100 performs certain options which correspond to the bit B1. For example, the various options which correspond to the values of particular bits B1 to B7 may be listed in a memory selection table provided on the back cover of the chassis of the television 100 or in a service manual. One example of a memory selection table is shown in FIG. 6D. As illustrated in the figure, if the bit B1 equals "0", the television 100 operates in accordance with the "sound auto off cancel" option. On the other hand, if the bit B1 equals "1", the television operates based on the "sound auto off" option.

In the conventional method for changing the value of the bit B1 to correspond to a particular option, the option diode corresponding to the particular operation of the television 100 would have to be manually turned on or off. However, in the present embodiment, the repairman can change the value of the bit B1 by displaying the bit B1 on the screen (FIG. 6B) and changing its value by entering an appropriate command from the remote controller 10. In addition, as shown in FIG. 6C, when the bit B1 is being displayed, the repairman can sequentially display subsequent bits B2, B3, etc. by pressing the volume up/down key on the controller 10.

As explained above, the repairman can select a control function from among the bus control function, the screen control function, and the memory selection control function by highlighting the particular control function via the channel up/down key (step S4). Then, after the particular control function is selected, it can be executed or performed by the microcomputer 14 by pressing the volume up/down key (step S5). After the function has been performed, any values or data which have been generated by the performed control function are stored in the E²PROM 16 (step S6).

When the particular control function has been performed and any corresponding data stored, the microcomputer 14 determines if another control function is to be selected (step S7). If another control function is to be selected, steps S4 to S6 are executed again. On the other hand, if another control function is not to be selected, the service mode is cancelled (step S8).

Another mode which may be performed by the microcomputer 14 is the factory mode. An example of how the factory mode operates is illustrated in the flow chart shown in FIG. 7. The factory mode is utilized during the manufacturing process of the bus-controlled television 100 by employing the remote controller 10 and a personal computer. Furthermore, such configuration enables the television 100 to be produced and tested without using an expensive bus controller.

As shown in FIG. 7, the television 100 is initially in a standby state before the microcomputer 14 executes the factory mode (step S11). As mentioned above, the standby state may represent the situation in which a power plug of the television 100 is inserted in an electrical outlet and power of the television is turned off. Subsequently, after power is supplied to the television 100 (step S12), the microcomputer 14 determines whether a factory mode command has been input. As illustrated in the figure, the factory mode command may be input by pressing a factory mode key on the remote controller 10 (step S13), and if the factory mode key has been input, the television 100 is set into the factory mode (step S14). On the other hand, if another key besides the factory mode key has been input, the television 100 performs the function which corresponds to the other key (step S15).

Furthermore, the factory mode key is generally provided only on a remote controller 10 designed to be used in the factory which manufactures the television. Accordingly, the remote controllers issued to the general consumers of the television 100 are not provided with such a key.

When a factory mode is set, the main menu illustrated in FIGS. 4A, 5A, and 6A is displayed on the screen, and the manufacturer can select one of the control functions listed on the main menu by highlighting a particular control function via the channel up/down key (step S16). Subsequently, the selected control function can be performed by pressing volume up/down key (step S17), and any values generated during the execution of the performed control function are stored in the E²PROM 16 (step S18).

After a selected control function has been performed and any generated values have been stored, the microcomputer 14 determines whether the manufacturer desires to exit the factory mode (step S19). In particular, if the mode is to be exited, the manufacturer presses the factory mode key twice or presses the power key to turn off the power. If either key is pressed, the factory mode is cancelled (step S20). On the other hand, if either key is not depressed, the process returns to step S16 to enable the manufacturer to select another control function from the main menu.

As illustrated above, the factory mode is similar to the service mode in several aspects. For example, steps S16 and S17 of the factory mode are the same as steps S4 and S5 of the service mode and perform the functions described above in conjunction with FIGS. 4A to 6D. However, the service mode differs from the factory mode in the manner in which the television 100 is set in each mode. In particular, the television 100 is set in the service mode by inputting a password via the remote controller 10 but is set in the factory mode by inputting the factory mode key on the remote controller 10.

Another mode which may be performed by the television is the aging mode. The aging mode is used to preheat the CRT 22 by projecting video images upon it for a certain period of time. Such mode is usually performed to test the CRT 22 after it has been combined with the television chassis during the production of the television 100.

Conventionally, since the CRT 22 is preheated while the television 100 is being conveyed through the factory on a conveyor, connecting an antenna to the television 100 is difficult. As a result, noise or "snow" is displayed on the CRT 22 while it is preheated, and thus, the intensity of the beam displaying the noise is low. Consequently, the CRT 22 cannot be sufficiently preheated and tested under a condition in which normal image signals are displayed on the CRT.

On the other hand, the aging mode of the present embodiment enables the CRT 22 to be preheated with signals which are displayed via a high intensity beam and does not require an antenna to be connected to the television 100. In particular, a predetermined number of video patterns are generated by the character information generator 18 and are displayed on the CRT 22 for a predetermined time interval so that the CRT 22 can be adequately preheated. After the CRT 22 is properly preheated, its condition is then evaluated to ensure that the CRT 22 is functioning appropriately.

An example of how the aging mode operates is illustrated in the flow chart shown in FIG. 8. In particular, the television 100 is initially in a standby state before being set in the aging mode (step S21). Then, when power is applied to the television 100 during the standby state (step S22) and the factory mode key on the remote controller 10 is input twice (step S23), the television is set in the aging mode (step S24).

Once the aging mode is established, the character information generator 18 automatically displays predetermined patterns of video images at regular intervals on the CRT 22 (step S25). For example, the microcomputer 14 may instruct the character information generator 18 and the chrominance signal processor 20 to repeatedly display the seven color bar screen, the cross hatch screen, the red screen, the green screen, the blue screen, and the white screen on the CRT 22 at six second intervals.

Since the video images of the patterns are generated by the generator 18, the a television signal does not need to be input via the tuner 24 of the television 100. As a result, an expensive external signal generator for generating a television signal or a cumbersome antenna for receiving a television signal is not required.

Also, while different patterns of video images are displayed on the CRT 22, alternating current (AC) is supplied to the television 100 and repeatedly turns the television on and off. As a result, the aging mode provides a method for recognizing that the television 100 is still in the aging mode even after it has been turned off. Specifically, the microcomputer 14 is programmed so that a specific bit located at a particular address of the E²PROM 16 is set to "1" when the aging mode is initially executed. As a result, when the television 100 is turned off and subsequently turned on, the microcomputer 14 reads the value of the specific bit stored in the E²PROM 16. If the value of the specific bit is "1", the microcomputer 14 immediately sets the television 100 in the aging mode. On the other hand, if the value of the specific is "0", the television 100 is not set in the aging mode.

While the CRT 22 is being heated by the various patterns of video images, aging data relating to the condition of the CRT 22 is stored in E²PROM 16 (step S26). After the E²PROM 16 stores each increment of aging data, the microcomputer 14 determines if the patterns of video images have been repeatedly displayed on the CRT 22 for longer than a predetermined period of time (step S27). For example, the video images may be displayed and the E²PROM may store aging data for a period of two hours.

After the predetermined time period has passed, the microcomputer 14 determines if the factory mode key or the power key has been depressed on the remote controller 10 (step S28). If the factory mode key or a power key has been input, the aging data stored in the E²PROM is erased (step S29), and the aging mode is cancelled (step S30). If the factory mode key or power key has not been depressed, step S25 is repeated.

In the embodiment described above, an additional mode key for setting the television 100 in the aging mode is not provided, and the television is set in the aging mode by pressing the factory mode key twice. However, the embodiment above could be modified such that an additional aging mode key is provided on the remote controller 10.

In addition to the aging mode, the television 100 may perform the high speed mode. The high speed mode enables the television 100 to perform various analog functions at much faster speeds and may be a treble speed mode during which certain functions are performed at three times the normal speed. By enacting the treble speed mode, the time required to test the various functions of the television 100 as it is being manufactured is drastically reduced.

An example of the operation of the treble speed mode is illustrated by the flow chart shown in FIG. 9. Specifically, the television 100 is initially in a standby state before being set in the treble speed mode (step S31). Subsequently, when power is applied to the television 100 during the standby state (step S32), the microcomputer 14 determines whether or not the treble speed key on the remote controller 10 is depressed (step S33). If such key is depressed, the television 100 is set in the treble speed mode (step S34). On the other hand, if another key besides the treble speed key has been input, the television performs the function which corresponds to the other key (step S35). After the treble speed mode is established, the manufacturer selects a function to be performed at the increased speed (step S36), and the selected function is then performed (step S37).

Some of the functions which may be performed at high speeds may relate to the contrast, brightness, color, tint, visibility, and volume of the television 100. Also, if a timer function is to be performed, the speed at which the timer operates may be increased by sixty times. In other words, the timer may operate such that one hour is treated as one minute.

After the selected function has been performed at the increased speed, the microcomputer 14 determines if another function is to be performed (step 38). If another function is to be performed, step S36 is executed again. However, if another function is not to be performed, the treble speed mode is cancelled (steps S39).

As described above, the bus-controlled television of the present invention can be produced without using an expensive bus controller. In addition, various operational modes can be implemented to reduce the time needed to test and produce the television. Furthermore, additional operational modes can be performed by a repairman to reduce the time and effort needed to repair a bus-controlled television.

It is to be understood that the above described embodiments of the invention are merely illustrative and that modifications of such embodiments may occur to those skilled in the art. Accordingly, this invention is not to be regarded as limited to the embodiments disclosed herein, but is to be limited only as defined by the appended claims.

What is claimed is:

1. A bus-controlled television having function control units interconnected via a data line, wherein said television comprises:

a remote controller which generates mode control signals that respectively correspond to operational modes of said television, wherein said operational modes are used to test various functions of said television and wherein said remote controller outputs one of said mode control signals as a selected mode control signal;

a microcomputer which designates one of said operational modes as a selected operational mode in accordance with said selected mode control signal and which outputs mode data corresponding to said selected operational mode via said data line in order to instruct at least one of said function control units to operate according to said selected mode;

a memory for storing preset values of said mode data for said selected operational mode;

a character information generator which receives display data from said microcomputer and generates on screen display data corresponding to said display data; and a signal processor which receives said on screen display data generated by said character signal processor and displays a video image on a display of said television in accordance with said on screen display data, wherein said microcomputer outputs said display data to said character information generator so that said signal processor displays a menu which lists at least one control function of at least one of said operating modes on said display.

2. The bus-controlled television as claimed in claim 1, wherein said operational modes comprise a service mode which enables various control functions to be performed in order to test whether or not said at least one of said function control units is operating correctly, wherein said remote controller generates a service mode control signal as said selected mode control signal when a user desires to activate said service mode, wherein said microcomputer designates said service mode as said selected operational mode and outputs service mode data in accordance with said service mode control signal, wherein said memory stores preset values of said service mode data, wherein said remote controller generates control function selection signals which respectively correspond to said control functions and outputs one of said control function selection signals as a selected control function selection signal after said service mode has been activated, wherein said microcomputer designates one of said control functions as a selected control function in accordance with said selected control function selection signal output from said remote controller and outputs control data which corresponds to said selected control function via said data line to instruct said at least one of said function control units to operate in accordance with said selected control function, and wherein said memory stores preset values of said control data for said selected control function.

3. The bus-controlled television as claimed in claim 2, wherein said control functions comprise a bus control function for adjusting first preset values of said preset values of said control data stored in said memory, wherein said bus control function comprises detailed bus control functions which respectively correspond to said first preset values stored in said memory, wherein said remote controller generates a detailed bus control function selection signal after said bus control function has been selected as said selected control function in order to select one of said detailed bus control functions as a selected detailed bus control function, and wherein said microcomputer selects said selected detailed bus control function based on said detailed bus control selection signal.

4. The bus-controlled television as claimed in claim 3, wherein said remote controller generates an adjustment signal for adjusting said first preset values which correspond to said selected detailed bus control function, wherein said microcomputer adjusts said first preset values which correspond to said selected detailed bus control function to create new first preset values which correspond to said selected detailed bus control function, and wherein said memory stores said new first preset values.

5. The bus-controlled television as claimed in claim 2, wherein said control functions comprise a screen control function for displaying pattern screen functions on said display of said television in accordance with said preset values of said control data stored in said memory, wherein said remote controller generates a pattern screen function selection signal after said screen control function has been selected as said selected control function in order to select one of said pattern screen functions as a selected pattern screen function, and wherein said microcomputer outputs display data corresponding to said selected pattern screen function to said character information generator so that said signal processor displays said selected pattern screen function on said display as said video image based on said preset values of said control data.

6. The bus-controlled television as claimed in claim 2, wherein said control functions comprise a memory selection control function for adjusting particular preset values of particular bits of said memory, wherein said particular preset values determine if said television operates in accordance with at least one performance option, wherein said remote controller generates a particular bit adjustment signal after said memory selection control function has been selected as said selected control function in order to adjust at least one of said particular preset values, wherein said microcomputer adjusts said at least one of said particular preset values based on said particular bit adjustment signal to create at least one new particular preset value, and wherein said memory stores said at least one new particular preset value.

7. The bus-controlled television as claimed in claim 4, wherein said control functions further comprise a screen control function for displaying pattern screen functions on said display of said television in accordance with said preset values of said control data stored in said memory and a memory selection control function for adjusting particular preset values of particular bits of said memory, wherein said remote controller generates a pattern screen function selection signal after said screen control function has been selected as said selected control function in order to select one of said pattern screen functions as a selected pattern screen function, wherein said microcomputer outputs display data corresponding to said selected pattern screen function to said character information generator so that said signal processor displays said selected pattern screen function on said display as said video image based on said preset values of said control data, wherein said particular preset values determine if said television operates in accordance with at least one performance option, wherein said remote controller generates a particular bit adjustment signal after said memory selection control function has been selected as said selected control function in order to adjust at least one of said particular preset values, wherein said microcomputer adjusts said at least one of said particular preset values based on said particular bit adjustment signal to create at least one new particular preset value, and wherein said memory stores said at least one new particular preset value.

8. The bus-controlled television as claimed in claim 2,
wherein said microcomputer outputs said mode data to said character information generator so that said signal processor displays a main menu which lists said control functions on said display.

9. The bus-controlled television as claimed in claim 8,
wherein said control functions comprise a bus control function for adjusting first preset values of said preset values of said control data stored in said memory, wherein said remote controller generates a bus control function selection signal to select said bus control function as said selected control function when a user desires to select said bus control function, wherein said microcomputer selects said bus control function and outputs bus control function data based on said bus control function selection signal, wherein said character information generator inputs said bus control function data and outputs bus control function on screen display data, and wherein said video processor displays a sub menu comprising a list of detailed bus control functions based on said bus control function on screen display data.

10. The bus-controlled television as claimed in claim 9,
wherein said remote controller generates a detailed bus control function selection signal to select one of said detailed bus control functions as a selected detailed bus control function when said user desires to select said one of said detailed bus control functions, wherein said microcomputer selects said one of said detailed bus control functions as said selected detailed bus control function and outputs detailed bus control function data based on said detailed bus control function selection signal, wherein said character information generator inputs said detailed bus control function data and outputs detail bus control function on screen display data, and wherein said video processor displays said selected detailed bus control function based on said detailed bus control function on screen display data.

11. The bus-controlled television as claimed in claim 10,
wherein said remote controller generates an adjustment signal for adjusting said first preset values which correspond to said selected detailed bus control function, wherein said microcomputer adjusts said first preset values to create new first preset values which correspond to said selected detailed bus control function, and wherein said memory stores said new first preset values.

12. The bus-controlled television as claimed in claim 8,
wherein said control functions comprise a screen control function for displaying pattern screen functions on said display of said television in accordance with said preset values of said control data stored in said memory, wherein said remote controller generates a screen control function selection signal to select said screen control function as said selected control function when a user desires to select said screen control function, wherein said microcomputer selects said screen control function and outputs screen control function data based on said screen control function selection signal, wherein said character information generator inputs said screen control function data and outputs screen control function on screen display data, and wherein said video processor displays a sub menu comprising a list of said pattern screen functions based on said screen control function on screen display data.

13. The bus-controlled television as claimed in claim 12,
wherein said remote controller generates a pattern screen function selection signal to select one of said pattern screen functions as a selected pattern screen function when said user desires to select said one of said pattern screen functions, wherein said microcomputer selects said one of said pattern screen functions as said selected pattern screen function and outputs pattern screen function data based on said pattern screen function selection signal, wherein said character information generator inputs said pattern screen function data and outputs pattern screen function on screen display data, and wherein said video processor displays said selected pattern screen function based on said pattern screen function on screen display data and said preset values of said control data stored in memory.

14. The bus-controlled television as claimed in claim 8,
wherein said control functions comprise a memory selection control function for adjusting particular preset values of particular bits of said memory, wherein said particular preset values determine if said television operates in accordance with at least one performance option, wherein said remote controller generates a particular bit selection signal to select one of said particular bits as a selected particular bit when said user desires to select said memory selection control function, wherein said microcomputer selects said one of said particular bits as said selected particular bit and outputs particular bit data based on said particular bit selection signal, wherein said character information generator inputs said particular bit data and outputs particular bit on screen display data, and wherein said video processor displays one of said particular preset values which corresponds to said selected particular bit based on said particular bit on screen display data.

15. The bus-controlled television as claimed in claim 14,
wherein said remote controller generates a particular bit adjustment signal after said one of said particular preset values is displayed on said screen in order to adjust said one of said particular preset values, wherein said microcomputer adjusts said one of said particular preset values based on said particular bit adjustment signal to create a new particular preset value which corresponds to said selected particular bit, and wherein said memory stores said new particular preset value.

16. The bus-controlled television as claimed in claim 11, wherein said control functions comprise a screen control function for displaying pattern screen functions on said display of said television in accordance with said preset values stored in said memory, wherein said remote controller generates a screen control function selection signal to select said screen control function as said selected control function when a user desires to select said screen control function, wherein said microcomputer selects said screen control function and outputs screen control function data based on said screen control function selection signal, wherein said character information generator inputs said screen control function data and outputs screen control function on screen display data, and wherein said video processor displays a sub menu comprising a list of said pattern screen functions based on said screen control function on screen display data.

17. The bus-controlled television as claimed in claim 16, wherein said remote controller generates a pattern screen function selection signal to select one of said pattern screen functions as a selected pattern screen function when said user desires to select said one of said pattern screen functions, wherein said microcomputer selects said one of said pattern screen functions as said selected pattern screen function and outputs pattern screen function data based on said pattern screen function selection signal, wherein said character information generator inputs said pattern screen function data and outputs pattern screen function on screen display data, and wherein said video processor displays said selected pattern screen function based on said pattern screen function on screen display data and said preset values of said control data stored in memory.

18. The bus-controlled television as claimed in claim 17, wherein said control functions comprise a memory selection control function for adjusting particular preset values of particular bits of said memory, wherein said particular preset values determine if said television operates in accordance with at least one performance option, wherein said remote controller generates a particular bit selection signal to select one of said particular bits as a selected particular bit when said user desires to select said memory selection control function, wherein said microcomputer selects said one of said particular bits as said selected particular bit and outputs particular bit data based on said particular bit selection signal, wherein said character information generator inputs said particular bit data and outputs particular bit on screen display data, and wherein said video processor displays one of said particular preset values which corresponds to said selected particular bit based on said particular bit on screen display data.

19. The bus-controlled television as claimed in claim 18, wherein said remote controller generates a particular bit adjustment signal after said one of said particular preset values is displayed on said screen in order to adjust said one of said particular preset values, and wherein said microcomputer adjusts said one of said particular preset values based on said particular bit adjustment signal to create a new particular bit preset value which corresponds to said selected particular bit, and wherein said memory stores said new particular preset value.

20. The bus-controlled television as claimed in claim 7, wherein said service mode is performed after said television has been manufactured and while said television is being repaired to ensure that said at least one of said function control units is operating properly, wherein said operational modes further comprise a factory mode which is performed while said television is being manufactured to ensure that at least another of said function control units is operating properly, wherein said factory mode enables said bus control function, said screen control function, and said memory selection control function to be performed, wherein said remote controller generates a factory mode control signal as said selected mode control signal when said user desires to activate said factory mode, and wherein said microcomputer designates said factory mode as said selected operational mode and outputs factory mode data in accordance with said factory mode control signal.

21. The bus-controlled television as claimed in claim 19, wherein said service mode is performed after said television has been manufactured and while said television is being repaired to ensure that said at least one of said function control units is operating properly, wherein said operational modes further comprise a factory mode which is performed while said television is being manufactured to ensure that at least another of said function control units is operating properly, wherein said factory mode enables said bus control function, said screen control function, and said memory selection control function to be performed, wherein said remote controller generates a factory mode control signal as said selected mode control signal when said user desires to activate said factory mode, and wherein said microcomputer designates said factory mode as said selected operational mode and outputs factory mode data in accordance with said factory mode control signal.

22. The bus-controlled television as claimed in claim 1, wherein said operational modes comprises an aging mode for preheating a cathode ray tube of said display by repeatedly projecting predetermined patterns of video images upon said cathode ray tube at certain intervals for a predetermined period of time, wherein said remote controller generates an aging mode control signal as said selected mode control signal when a user desires to activate said aging mode, wherein said microcomputer designates said aging mode as said selected operational mode and outputs aging mode data in accordance with said aging mode control signal, wherein said character information generator inputs said aging mode data and outputs aging mode on screen display data, and wherein said video processor repeatedly projects said predetermined patterns of video images on said cathode ray tube based on said aging mode on screen data.

23. The bus-controlled television as claimed in claim 22,
wherein said television repeatedly turns on and off while said predetermined patterns of video images are being repeatedly projected on said cathode ray tube, and
wherein said microcomputer stores data at a specific address when said aging mode is first activated and reads said data from said specific address each instance said television turns on in order to determine whether said television is currently in said aging mode.

24. The bus-controlled television as claimed in claim 23,
wherein aging data is stored in said memory during said aging mode and is erased from said memory when said aging mode is cancelled.

25. The bus-controlled television as claimed in claim 1,
wherein said operational modes comprises a high speed mode which enables said television to perform analog functions at high speeds,
wherein said remote controller generates a high speed mode control signal as said selected mode control signal when a user desires to activate said high speed mode,
wherein said microcomputer designates said high speed mode as said selected operational mode and outputs high speed mode data in accordance with said high speed mode control signal, and
wherein at least one of said function control units performs at least one of said analog functions at high speed in accordance with said high speed mode data.

26. The bus-controlled television as claimed in claim 20, further comprising:
wherein said operational modes comprise an aging mode for preheating a cathode ray tube of said display by repeatedly projecting predetermined patterns of video images upon said cathode ray tube at certain intervals for a predetermined period of time.
wherein said remote controller generates an aging mode control signal as said selected mode control signal when said user desires to activate said aging mode,
wherein said microcomputer designates said aging mode as said selected operational mode and outputs aging mode data in accordance with said aging mode control signal,
wherein said character information generator inputs said aging mode data and outputs aging mode on screen display data, and
wherein said video processor repeatedly projects said predetermined patterns of video images on said cathode ray tube based on said aging mode on screen data.

27. The bus-controlled television as claimed in claim 26,
wherein said television repeatedly turns on and off while said predetermined patterns of video images are being repeatedly projected on said cathode ray tube,
wherein said microcomputer stores data at a specific address when said aging mode is first activated and reads said data from said specific address each instance said television turns on in order to determine whether said television is currently in said aging mode.

28. The bus-controlled television as claimed in claim 27,
wherein aging data is stored in said memory during said aging mode and is erased from said memory when said aging mode is cancelled.

29. The bus-controlled television as claimed in claim 26,
wherein said operational modes comprise a high speed mode which enables said television to perform analog functions at high speeds,
wherein said remote controller generates a high speed mode control signal as said selected mode control signal when said user desires to activate said high speed mode,
wherein said microcomputer designates said high speed mode as said selected operational mode and outputs high speed mode data in accordance with said high speed mode control signal, and
wherein said at least one of said function control units performs at least one of said analog functions in accordance with said high speed mode data.

30. The bus-controlled television as claimed in claim 21,
wherein said operational modes comprise an aging mode for preheating a cathode ray tube of said display by repeatedly projecting predetermined patterns of video images upon said cathode ray tube at certain intervals for a predetermined period of time,
wherein said remote controller generates an aging mode control signal as said selected mode control signal when said user desires to activate said aging mode,
wherein said microcomputer designates said aging mode as said selected operational mode and outputs aging mode data in accordance with said aging mode control signal,
wherein said character information generator inputs said aging mode data and outputs aging mode on screen display data, and
wherein said video processor repeatedly projects said predetermined patterns of video images on said cathode ray tube based on said aging mode on screen data.

31. The bus-controlled television as claimed in claim 30,
wherein said television repeatedly turns on and off while said predetermined patterns of video images are being repeatedly projected on said cathode ray tube, and
wherein said microcomputer stores data at a specific address when said aging mode is first activated and reads said data from said specific address each instance said television turns on in order to determine whether said television is currently in said aging mode.

32. The bus-controlled television as claimed in claim 31,
wherein aging data is stored in said memory during said aging mode and is erased from said memory when said aging mode is cancelled.

33. The bus-controlled television as claimed in claim 30,
wherein said operational modes comprise a high speed mode which enables said television to perform analog functions at high speeds,
wherein said remote controller generates a high speed mode control signal as said selected mode control signal when said user desires to activate said high speed mode,
wherein said microcomputer designates said high speed mode as said selected operational mode and outputs high speed mode data in accordance with said high speed mode control signal, and
wherein said at least one of said function control units performs at least one of said analog functions in accordance with said high speed mode data.

34. A bus-controlled television having function control units interconnected via a data line, wherein said television comprises:

a remote controller which generates mode control signals that respectively correspond operational modes of said television, wherein said operational modes comprise:

a service mode, during which various control functions are performed after said television has been manufactured and while said television is being repaired to ensure that at least one of said function control units is operating properly a factory mode, during which said various control functions are performed while said television is being manufactured to ensure that at least another of said function control units is operating properly, an aging mode, during which a cathode ray tube of said television is preheated by repeatedly projecting predetermined patterns of video images upon said cathode ray tube at certain intervals for a predetermined period of time, and a high speed mode, during which said television performs analog functions at high speed to reduce an period of time necessary to test whether or not said analog functions are operating properly, and wherein said remote controller outputs a service mode control signal, a factory mode control signal, an aging mode control signal, and a high speed mode control signal when a user respectively desires to activate said service mode, said factory mode, said aging mode, and said high speed mode; and a microcomputer which sets said television in said service mode when said remote controller outputs said service mode control signal, sets said television in said factory mode when said remote controller outputs said factory mode control signal, sets said television in said aging mode when said remote controller outputs said aging mode control signal, sets said television in said high speed mode when said remote controller outputs said high speed mode control signal;

a character information generator which receives display data from said microcomputer and generates on screen display data corresponding to said display data; and a signal processor which receives said on screen display data generated by said character signal processor and displays a video image on a display of said television in accordance with said on screen display data, wherein said microcomputer outputs said display data to said character information generator so that said signal processor displays a menu which lists at least one control function of at least one of said operational modes on said display.

35. A method for performing a service mode of a bus-controlled television, wherein said television comprises a remote controller which outputs control signals, function control units which are interconnected via a data line, and a microcomputer which inputs said control signals and outputs corresponding control data to said function control units via said data line, wherein said method comprises the steps of:

(a) inputting a service mode password into said remote controller, wherein said service mode password is input while said television is in a standby state;

(b) outputting a service mode control signal from said remote controller to said microcomputer, wherein said service mode control signal corresponds to said service mode password, wherein said microcomputer activates said service mode based on said service mode control signal, and wherein said service mode enables various control functions to be performed in order to test whether or not at least one of said function control units is operating properly, wherein said step (b) comprises the steps of:

(b1) outputting display data from said microcomputer to a character information generator after said microcomputer inputs said service mode control signal;

(b2) generating on screen display data which represents a list of said control functions via said character information generator, wherein said on screen display data corresponds to said display data;

(b3) outputting said on screen display data to a signal processor; and (b4) displaying said list of said control functions on a display of said television via said signal processor;

(c) inputting a control function selection input to said remote controller, wherein said control function selection input corresponds to a selected control function of said control functions;

(d) outputting a control function selection signal from said remote controller to said microcomputer, where in said control function selection signal corresponds to said control function selection input;

(e) designating one of said control functions as said selected control function via said microcomputer, where said microcomputer designates said one of said control functions as said selected control function in accordance with said control function selection signal;

(f) outputting control data which corresponds to said selected control function from said microcomputer on said data line to instruct said at least one of said function control units to operate in accordance with said selected control function;

(g) determining if said at least one of said function control units operates properly based on said selected control function;

(h) if said at least one of said function control units operates properly, storing a value of said control data in a memory;

(i) determining if another control function selection input has been input to said remote controller by determining if said remote controller has output another control function selection signal based on said other control function selection input;

(j) if said other control function selection input has been input to said remote controller, designating said other control function selection signal as said control function selection signal and repeating said steps (e) through (i); and (k) if said other control function selection input has not been input to said remote controller, cancelling said service mode.

36. The method for performing a service mode according to claim 35, wherein said selected control function is a bus control function for adjusting preset values of said control data stored in said memory and wherein said bus control function comprises detailed bus control functions which respectively correspond to first preset values of said preset values of said control data stored in said memory, and wherein said step (f) further comprises the steps of:

(f1) inputting a detailed bus control function input to said remote controller for generating a detailed bus control function selection signal;

(f2) outputting said detailed bus control function selection signal from said remote controller to said microcomputer based on said detailed bus control function input; and (f3) selecting one of said detailed bus control functions via said microcomputer based on said detailed bus control function selection signal.

37. The method for performing a service mode according to claim 36, wherein said step (f) further comprises the steps of:

(f4) inputting an adjustment input to said remote controller for generating an adjustment signal;

(f5) outputting an adjustment signal from said remote controller to said microcomputer based on said adjustment input;

(f6) adjusting said first preset values which correspond to said one of said detailed bus control functions via said microcomputer based on said adjustment signal to generate new first preset values; and (f7) storing said new first preset values in said memory.

38. The method for performing a service mode according to claim 35, wherein said selected control function is a screen control function for displaying pattern screen functions on a display of said television in accordance with preset values of said control data stored in said memory, and wherein said step (f) further comprises the steps of:

(f1) inputting a pattern screen function input to said remote controller for generating a pattern screen function selection signal;

(f2) outputting said pattern screen function selection signal from said remote controller to said microcomputer based on said pattern screen function input; and (f3) selecting one of said pattern screen functions via said microcomputer based on said pattern screen function selection signal.

39. A method for performing a service mode of a bus-controlled television, wherein said television comprises a remote controller which outputs control signals, function control units which are interconnected via a data line, and a microcomputer which inputs said control signals and outputs corresponding control data to said function control units via said data line, wherein said method comprises the steps of:

(a) inputting a service mode password into said remote controller, wherein said service mode password is input while said television is in a standby state;

(b) outputting a service mode control signal from said remote controller to said microcomputer, wherein said service mode control signal corresponds to said service mode password, wherein said microcomputer activates said service mode based on said service mode control signal, and wherein said service mode enables various control functions to be performed in order to test whether or not at least one of said function control units is operating properly;

(c) inputting a control function selection input to said remote controller, wherein said control function selection input corresponds to a selected control function of said control functions;

(d) outputting a control function selection signal from said remote controller to said microcomputer, wherein said control function selection signal corresponds to said control function selection input;

(e) designating one of said control functions as said selected control function via said microcomputer, where said microcomputer designates said one of said control functions as said selected control function in accordance with said control function selection signal;

(f) outputting control data which corresponds to said selected control function from said microcomputer on said data line to instruct said at least one of said function control units to operate in accordance with said selected control function;

(g) determining if said at least one of said function control units operates properly based on said selected control function;

(h) if said at least one of said function control units operates properly, storing a value of said control data in a memory;

(i) determining if another control function selection input has been input to said remote controller by determining if said remote controller has output another control function selection signal based on said other control function selection input;

(j) if said other control function selection input has been input to said remote controller, designating said other control function selection signal as said control function selection signal and repeating said steps (e) through (i); and (k) if said other control function selection input has not been input to said remote controller, cancelling said service mode, wherein said selected control function is a screen control function for displaying pattern screen functions on a display of said television in accordance with preset values of said control data stored in said memory, and wherein said step (f) further comprises the steps of:

(f1) inputting a pattern screen function input to said remote controller for generating a pattern screen function selection signal;

(f2) outputting said pattern screen function selection signal from said remote controller to said microcomputer based on said pattern screen function input;

(f3) selecting one of said pattern screen functions via said microcomputer based on said pattern screen function selection signal;

(f4) outputting display data from said microcomputer to a character information generator via said data line, wherein said display data corresponds to said one of said pattern screen functions;

(f5) generating on screen display data via said character information generator based on said display data;

(f6) outputting said on screen data to a signal processor; and (f7) displaying said one of said pattern screen functions on said display via said signal processor based on said on screen display data.

40. A method for performing a service mode of a bus-controlled television, wherein said television comprises a remote controller which outputs control signals, function control units which are interconnected via a data line, and a microcomputer which inputs said control signals and outputs corresponding control data to said function control units via said data line, wherein said method comprises the steps of:

(a) inputting a service mode password into said remote controller, wherein said service mode password is input while said television is in a standby state;

(b) outputting a service mode control signal from said remote controller to said microcomputer, wherein said service mode control signal corresponds to said service mode password, wherein said microcomputer activates said service mode based on said service mode control signal, and wherein said service mode enables various control functions to be performed in order to test whether or not at least one of said function control units is operating properly;

(c) inputting a control function selection input to said remote controller, wherein said control function selection input corresponds to a selected control function of said control functions;

(d) outputting a control function selection signal from said remote controller to said microcomputer, wherein said control function selection signal corresponds to said control function selection input;

(e) designating one of said control functions as said selected control function via said microcomputer, where said microcomputer designates said one of said control functions as said selected control function in accordance with said control function selection signal;

(f) outputting control data which corresponds to said selected control function from said microcomputer on said data line to instruct said at least one of said function control units to operate in accordance with said selected control function;

(g) determining if said at least one of said function control units operates properly based on said selected control function;

(h) if said at least one of said function control units operates properly, storing a value of said control data in a memory;

(i) determining if another control function selection input has been input to said remote controller by determining if said remote controller has output another control function selection signal based on said other control function selection input;

(j) if said other control function selection input has been input to said remote controller, designating said other control function selection signal as said control function selection signal and repeating said steps (e) through (i); and (k) if said other control function selection input has not been input to said remote controller, cancelling said service mode, wherein said selected control function is a memory selection control function for adjusting particular preset values of particular bits of said memory, wherein said particular preset values determine if distinct performance modes are enabled or disabled during a normal operation of said television, and wherein said step (f) further comprises the steps of:

(f1) inputting a particular bit adjustment input to said remote controller for generating a particular bit adjustment signal;

(f2) outputting said particular bit adjustment signal to said microcomputer;

(f3) adjusting at least one of said particular preset values based on said particular bit adjustment signal via said microcomputer to create at least one new particular bit preset value; and (f4) storing said at least one new particular preset value in said memory.

41. The method for performing a service mode according to claim 35, wherein said service mode is activated after said television has been manufactured and while said television is being repaired to ensure that said at least one of said function control units is operating properly.

42. A method for performing a factory mode of a bus-controlled television, wherein said television comprises a remote controller which outputs control signals, function control units which are interconnected via a data line, and a microcomputer which inputs said control signals and outputs corresponding control data to said function control units via said data line, wherein said method comprises the steps of:

(a) depressing a factory mode key of said remote controller, wherein said factory mode key is depressed while said television is in a standby state;

(b) outputting a factory mode control signal from said remote controller to said microcomputer when said factory mode key is depressed, wherein said microcomputer activates said factory mode based on said factory mode control signal and wherein said factory mode enables various control functions to be performed in order to test whether or not at least one of said function control units is operating properly, wherein said step (b) further comprises the steps of:

(b1) outputting display data from said microcomputer to a character information generator after said microcomputer inputs said factory mode control signal;

(b2) generating on screen display data which represents a list of said control functions via said character information generator, wherein said on screen display data corresponds to said display data;

(b3) outputting said on screen display data to a signal processor; and (b4) displaying said list of said control functions on a display of said television via said signal processor;

(c) inputting a control function selection input to said remote controller, wherein said control function selection input corresponds to a selected control function of said control functions;

(d) outputting a control function selection signal from said remote controller to said microcomputer, wherein said control function selection signal corresponds to said control function selection input;

(e) designating one of said control functions as a selected control function via said microcomputer, where said microcomputer designates said one of said control functions as said selected control function in accordance with said control function selection signal;

(f) outputting control data which corresponds to said selected control function from said microcomputer on said data line to instruct said at least one of said function control units to operate in accordance with said selected control function;

(g) determining if said at least one of said function control units operates properly based on said selected control function;

(h) if said at least one of said function control units operates properly, storing a value of said control data in a memory;

(i) determining if another control function selection input has been input to said remote controller by determining if said remote controller has output another control function selection signal based on said other control function selection input;

(j) if said other control function selection input has been input to said remote controller, designating said other control function selection signal as said control function selection signal and repeating said steps (e) through (i); and (k) if said other control function selection input has not been input to said remote controller, cancelling said factory mode.

43. The method for performing a factory mode according to claim 42, wherein said selected control function is a bus control function for adjusting preset values of said control data stored in said memory and wherein said bus control function comprises detailed bus control functions which respectively correspond to first preset values of said preset values of said control data stored in said memory, and wherein said step (f) further comprises the steps of:

(f1) inputting a detailed bus control function input to said remote controller for generating a detailed bus control function selection signal;

(f2) outputting said detailed bus control function selection signal from said remote controller to said microcomputer based on said detailed bus control function input; and (f3) selecting one of said detailed bus control functions via said microcomputer based on said detailed bus control function selection signal.

44. The method for performing a factory mode according to claim 43, wherein said step (f) further comprises the steps of:

(f4) inputting an adjustment input to said remote controller for generating an adjustment signal;

(f5) outputting an adjustment signal from said remote controller to said microcomputer based on said adjustment input;

(f6) adjusting said first preset values which correspond to said one of said detailed bus control functions via said microcomputer based on said adjustment signal to generate new first preset values; and (f7) storing said new first preset values in said memory.

45. The method for performing a factory mode according to claim 42, wherein said selected control function is a screen control function for displaying pattern screen functions on a display of said television in accordance with preset values of said control data stored in said memory, and wherein said step (f) further comprises the steps of:

(f1) inputting a pattern screen function input to said remote controller for generating a pattern screen function selection signal;

(f2) outputting said pattern screen function selection signal from said remote controller to said microcomputer based on said pattern screen function input; and (f3) selecting one of said pattern screen functions via said microcomputer based on said pattern screen function selection signal.

46. A method for performing a factory mode of a bus-controlled television, wherein said television comprises a remote controller which outputs control signals, function control units which are interconnected via a data line, and a microcomputer which inputs said control signals and outputs corresponding control data to said function control units via said data line, wherein said method comprises the steps of:

(a) depressing a factory mode key of said remote controller, wherein said factory mode key is depressed while said television is in a standby state;

(b) outputting a factory mode control signal from said remote controller to said microcomputer when said factory mode key is depressed, wherein said microcomputer activates said factory mode based on said factory mode control signal and wherein said factory mode enables various control functions to be performed in order to test whether or not at least one of said function control units is operating property;

(c) inputting a control function selection input to said remote controller, wherein said control function selection input corresponds to a selected control function of said control functions;

(d) outputting a control function selection signal from said remote controller to said microcomputer, wherein said control function selection signal corresponds to said control function selection input;

(e) designating one of said control functions as a selected control function via said microcomputer, where said microcomputer designates said one of said control functions as said selected control function in accordance with said control function selection signal;

(f) outputting control data which corresponds to said selected control function from said microcomputer on said data line to instruct said at least one of said function control units to operate in accordance with said selected control function;

(g) determining if said at least one of said function control units operates properly based on said selected control function;

(h) if said at least one of said function control units operates properly storing a value of said control data in a memory;

(i) determining if another control function selection input has been input to said remote controller by determining if said remote controller has output another control function selection signal based on said other control function selection input;

(j) if said other control function selection input has been input to said remote controller, designating said other control function selection signal as said control function selection signal and repeating said steps (e) through (i); and (k) if said other control function selection input has not been input to said remote controller, cancelling said factory mode, wherein said selected control function is a screen control function for displaying pattern screen functions on a display of said television in accordance with preset values of said control data stored in said memory, and wherein said step (f) further comprises the steps of:

(f1) inputting a pattern screen function input to said remote controller for generating a pattern screen function selection signal;

(f2) outputting said pattern screen function selection signal from said remote controller to said microcomputer based on said pattern screen function input;

(f3) selecting one of said pattern screen functions via said microcomputer based on said pattern screen function selection signal;

(f4) outputting display data from said microcomputer to a character information generator via said data line, wherein said display data corresponds to said one of said pattern screen functions;

(f5) generating on screen display data via said character information generator based on said display data;

(f6) outputting said on screen data to a signal processor; and (f7) displaying said one of said pattern screen functions on said display via said signal processor based on said on screen display data.

47. The method for performing a factory mode according to claim 42, wherein said selected control function is a memory selection control function for adjusting particular preset values of particular bits of said memory, wherein said particular preset values determine if said television operates in accordance with at least one performance option, and wherein said step (f) further comprises the steps of:

(f1) inputting a particular bit adjustment input to said remote controller for generating a particular bit adjustment signal;

(f2) outputting said particular bit adjustment signal to said microcomputer;

(f3) adjusting at least one of said particular preset values based on said particular bit adjustment signal via said microcomputer to create at least one new particular bit preset value; and (f4) storing said at least one new particular preset value in said memory.

48. The method for performing a factory mode according to claim 42, wherein said factory mode is activated during a manufacturing process of said television to ensure that said at least one of said function control units is operating properly.

49. A method for performing an aging mode of a bus-controlled television, wherein said television comprises a remote controller which outputs control signals, function control units which are interconnected via a data line, and a microcomputer which inputs said control signals and outputs corresponding control data to said function control units via said data line, wherein said method comprises the steps of:

(a) inputting an aging mode command into said remote-controller, wherein said aging mode command is input while said television is in a standby state;

(b) outputting an aging mode control signal from said remote controller to said microcomputer, wherein said aging mode control signal corresponds to said aging mode command;

(c) activating said aging mode via said microcomputer based on said aging mode control signal, wherein said aging mode preheats a cathode ray tube of said television by repeatedly projecting predetermined patterns of video images upon said cathode ray tube at certain intervals for a predetermined period of time;

(d) outputting aging mode data from said microcomputer to said data line, wherein said aging mode data represents said predetermined patterns of video images;

(e) inputting said aging mode data to a character information generator to produce aging mode on screen data;

(f) outputting said aging mode on screen data to a video processor;

(g) repeatedly projecting said predetermined patterns of video images on said cathode ray tube for said predetermined period of time via said video processor based on said aging mode on screen data;

(h) storing aging data in a memory, wherein said aging data relates to a result of projecting said predetermined patterns of video images on said cathode ray tube;

(i) determining whether or not said predetermined patterns of video images have been projected for said predetermined period of time; and (j) if said predetermined patterns of video images have not been projected for said predetermined period of time, repeating said steps (d) through (i).

50. The method for performing an aging mode according to claim 49, further comprising the steps of:

(k) if said predetermined patterns of video images have been projected for said predetermined period of time, determining if an aging mode cancel command has been input via said remote controller;

(l) if said aging mode cancel command has been input, cancelling said aging mode; and (m) if said aging mode cancel command has not been input, repeating said steps (d) through (k).

51. The method for performing an aging mode according to claim 49, wherein said step (f) further comprises the steps of:

(f1) repeatedly turning said television on and off while said predetermined patterns of video images are being repeatedly projected on said cathode ray tube;

(f2) storing data at a specific address of said memory when said aging mode is first activated;

(f3) reading said data from said specific address each instance said television turns on; and (f4) determining whether or not said television is currently in said aging mode based on said data read from said specific address.

52. The method for performing an aging mode according to claim 50, wherein said step (l) further comprises the step of:

(l1) erasing said aging data from said memory if said aging mode cancel command has been input.

* * * * *